United States Patent [19]

Gammino

[11] Patent Number: 5,359,643
[45] Date of Patent: Oct. 25, 1994

[54] TELECOMMUNICATIONS DEVICE WITH SIMPLIFIED CALLING PROCEDURES

[76] Inventor: John R. Gammino, 6 East Point Rd., Lincroft, N.J. 07738

[21] Appl. No.: 9,318

[22] Filed: Jan. 26, 1993

[51] Int. Cl.$^5$ .......................................... H04M 17/00
[52] U.S. Cl. .................................... 379/143; 379/144; 379/155; 379/146
[58] Field of Search ............... 379/143, 144, 145, 155, 379/112, 113, 201, 123

[56] References Cited

U.S. PATENT DOCUMENTS

| | | | |
|---|---|---|---|
| 4,706,275 | 11/1987 | Kamil | 379/144 |
| 4,791,640 | 12/1988 | Sand | 379/144 X |
| 4,794,642 | 12/1988 | Arbabzadah et al. | |
| 4,897,870 | 1/1990 | Golden | |
| 4,908,852 | 3/1990 | Hird et al. | |
| 4,922,519 | 5/1990 | Daudelin | |
| 4,926,469 | 5/1990 | Smith et al. | 379/123 X |
| 4,933,965 | 6/1990 | Hird et al. | |
| 4,935,956 | 6/1990 | Hellwarth et al. | |
| 5,046,183 | 9/1991 | Dorst et al. | |
| 5,113,433 | 5/1992 | Hird et al. | |
| 5,131,027 | 7/1992 | Hird et al. | 379/144 X |

Primary Examiner—Stephen Chin
Assistant Examiner—Paul Loomis
Attorney, Agent, or Firm—Ratner & Prestia

[57] ABSTRACT

A telephone call is conveniently placed between a telecommunications device and a central office. A first plurality of signals representing a telephone dialing digit not including "0", followed by a multiple-digit phone number, is received. At least one signal which indicates a desired method of making payment for the telephone call is then received. Arrangements are made for payment of the telephone call according to the desired method of payment. The telephone call is then placed by transmitting a second plurality of signals representing the multiple-digit phone number to the central office.

11 Claims, 8 Drawing Sheets

TELECOMMUNICATIONS DEVICE WITH SIMPLIFIED CALLING PROCEDURES

FIELD OF THE INVENTION

The present invention relates to telecommunication devices and more specifically to the use of telecommunication devices to place a telephone call. In particular, a method and apparatus is disclosed by which the placement of a call from a telecommunications device is simplified.

BACKGROUND OF THE INVENTION

In the present mode for operating the public telephone network, payment for a telephone call may be made through a variety of methods. A telephone call may be paid for by depositing coinage into a telecommunications device. Alternatively, by placing a collect call, a called party agrees to pay the charges associated with the telephone call. When placing a calling card call, a calling party provides an account number to which the cost associated with the telephone call will be charged. Calling card calls may be made, for example, using calling cards, credit cards and debit cards. By obtaining third party billing, a third party agrees to pay the charges associated with a telephone call between a back party and a front party.

Because of the large number of choices by which a telephone call may be paid for, some users of telecommunications devices may be confused as to the proper operation of such devices. Specifically, some such calls are prefixed by dialing digit "1". Other such calls may need to be prefixed by dialing digit "0". In still further situations, the use of a prefix will prevent proper completion of a call. Thus, the user of a telecommunications device may be confused as to the proper operation of the device.

SUMMARY OF THE INVENTION

A method is disclosed for placing a telephone call through a central office from a telecommunications device. A first plurality of signals representing a telephone dialing digit not including "0", followed by a multi-digit phone number, is received. At least one signal which indicates a desired method of making payment for the telephone call is then received. Arrangements are made for payment of the telephone call according to the desired method of payment. The telephone call is then placed by transmitting a second plurality of signals representing the multi-digit phone number no the central office.

DETAILED DESCRIPTION

Figure 1:
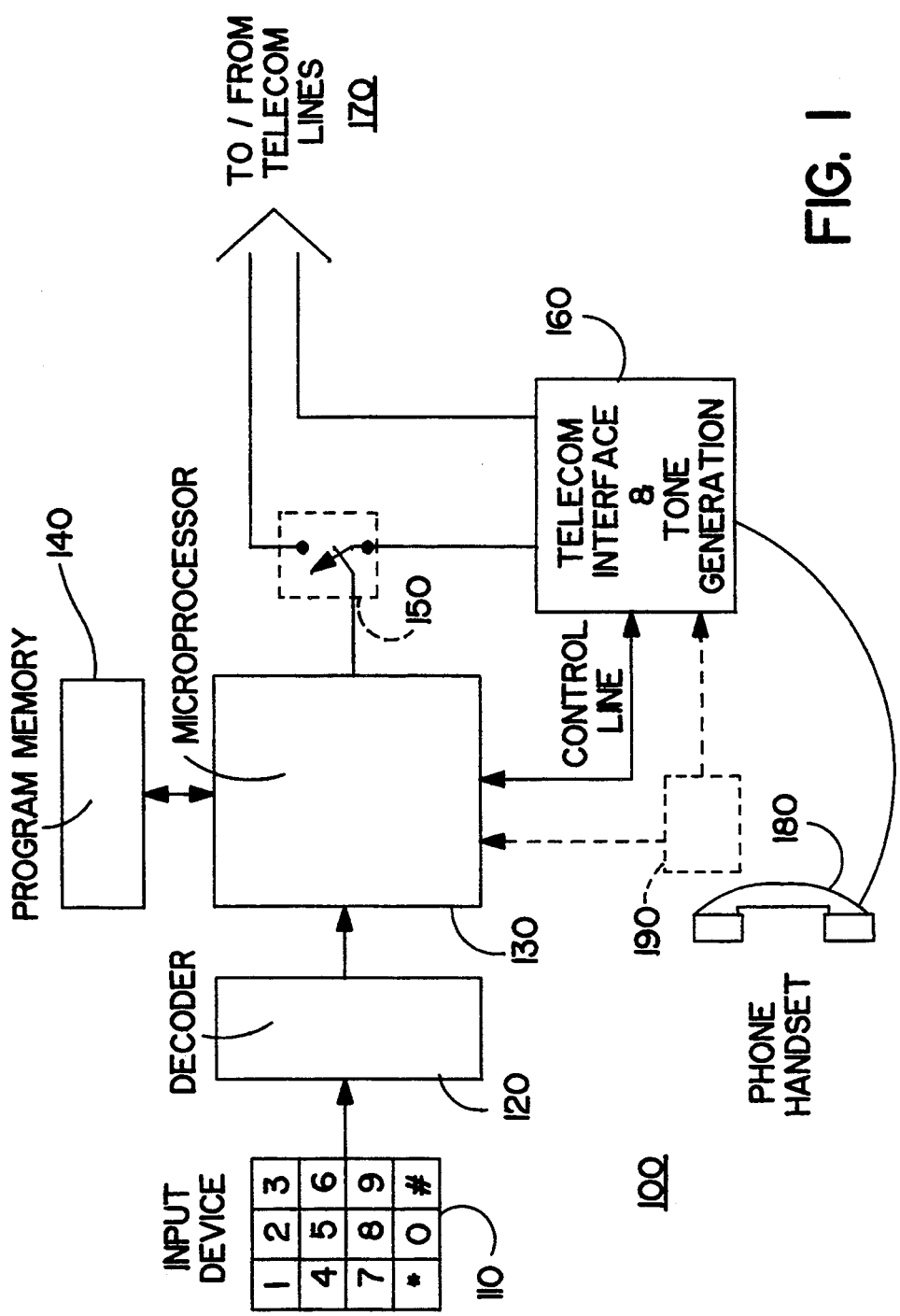
FIG. 1 is a block diagram of a smart telephone which operates in conjunction with an exemplary embodiment of the present invention.

A standard "smart" telephone which operates in conjunction with an exemplary embodiment of the present invention is illustrated in FIG. 1. As shown in FIG. 1, a telecommunications device 100 (e.g. AT&T Public Phone 2000) is coupled to telecommunication lines 170 through telecommunication interface and tone generation circuitry 160. Item 160 may include, for example, semiconductor device TP 5088 (manufactured by International Semiconductor Corporation). Furthermore, the telecommunications interface may be implemented using circuit configurations which are well known to one skilled in the art of designing telecommunications systems.

Telecommunication line 170 may be used for a variety of different functions, for example, for interfacing to any type of commercial telephone network. Alternately, telecommunications line 170 may be used for interfacing to any type of private network including, but not limited to, government or corporate owned networks. Furthermore, telecommunications line 170 may be used for interfacing to a limited access type network, for example, a telecommunications line which has been specifically identified by a central office (or an analogous switch) for dedicated use (e.g. pay telephone signalling protocols). Furthermore, telecommunications line 170 may be coupled to a variety of telephone networks (e.g. a cellular network). Thus, the present invention may also be used for portable (including cellular) and mass transit applications.

Switch 150 is optionally located between telecommunication interface and tone generation circuitry 160 and telecommunication lines 170. By applying an appropriate control signal to switch 150, communications between telecommunications device 100 and telecommunications lines 170 can be effectively stopped.

The control signal which is received by switch 150 originates from microprocessor 130. In an exemplary embodiment of the present invention, microprocessor 130 may be a device such as a Z80 semiconductor device available from Zilog Corporation, a 6800 semiconductor device available from Motorola Corporation, etc. Microprocessor 130 is coupled to program memory 140 in which appropriate routines for use by microprocessor 130 are stored. Exemplary programs for controlling microprocessor 130 are described below with reference to FIGS. 2, 3 and 4.

As shown in FIG. 1, input device 110 may be used for entering a plurality of digits into telecommunications device 100. Input device 110 is coupled to decoder 120. In an exemplary embodiment of the present invention, decoder 120 may be a semiconductor device 74C923 manufactured by National Semiconductor Corporation. Each digit which is entered using input device 110 is detected by decoder 120. Decoder 120 transmits this information to microprocessor 130. Microprocessor 130 then transmits appropriate signals to telecommunications interface and tone generation 160.

Microprocessor 130 is also coupled to user interface 190. User interface 190 provides instructions to the user of telecommunications device 100. These instructions may be provided to the user by display or through phone handset 180. However, the use of user interface 190 is optional. As an alternative, instructions may simply be printed on or near the telecommunications device.

User interface 190 may also be optionally used to receive information from the user of telecommunications device 100. For example, user interface 190 may include a plurality of switches for receiving information. Alternately, user interface 190 may be optionally coupled to handset 180 and include voice recognition circuitry for receiving voice messages from a user of telecommunications device 100.

A user enters a plurality of numbers using input device 110. Based on the particular digit sequence which is entered, microprocessor 130 directs telecommunications interface and tone generation 160 to produce appropriate DTMF tones. Assuming switch 150 is in the closed position, these tones are transmitted to telecommunications lines 170.

Furthermore, in an exemplary embodiment of the present invention, numbers (or the symbols # and *) are entered using a telephone keypad. However, it is contemplated that alternative methods for entering numbers may be used in order to produce appropriate tones from telecommunication interface and tone generation circuitry 160. For example, a desired number sequence may be entered using a traditional rotary device (not shown). Alternately, a digit sequence may be stored in an information medium (not shown) (e.g. a credit card magnetic stripe, a smart card, etc.). The telecommunications device may include a reader (not shown) which is capable of reading the digit sequence (e.g. from the magnetic medium, the smart cards etc.). Alternately, a digit sequence may be spoken by the user and then converted into appropriate electronic signals by voice recognition circuitry included in user interface 190. Thus, it is understood that the digit sequence may be entered into telecommunications device 100 in a variety of ways.

Figure 2:
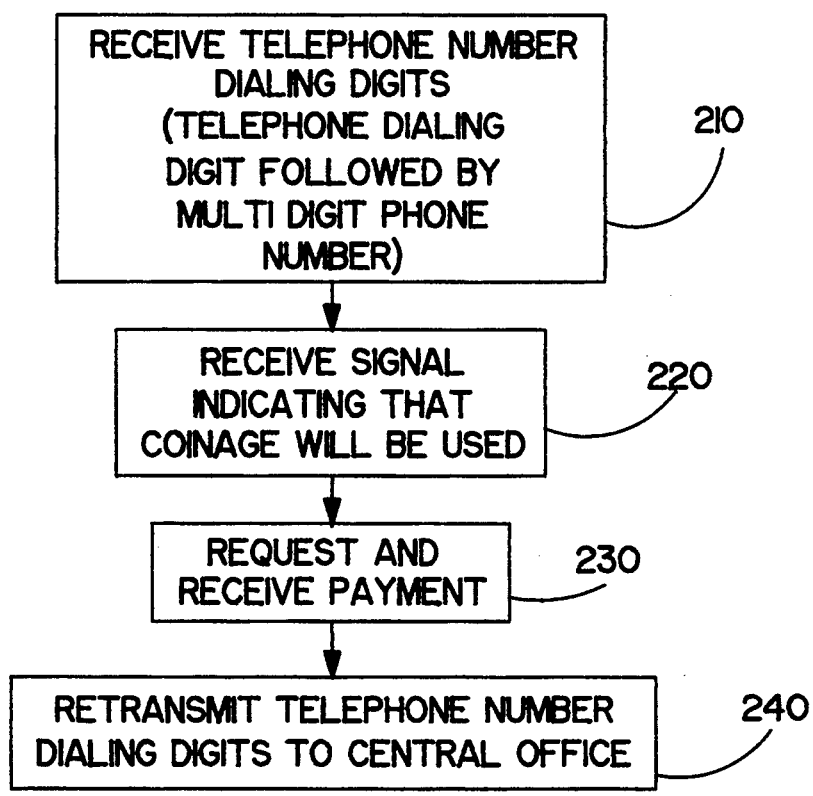
FIG. 2 is a flow chart diagram which illustrates the use of coinage in conjunction with an exemplary embodiment of the present invention.

Operation of an exemplary embodiment of the present invention is shown by the flow chart diagram which is illustrated in FIG. 2. The exemplary embodiment of the present invention which is illustrated in FIG. 2 may be used in conjunction with a smart telephone as illustrated, for example, by FIG. 1.

FIG. 2 illustrates exemplary operation of the telecommunications device shown in FIG. 1 when coinage is used to complete a telephone call. At step 210, telephone number dialing digits are received by microprocessor 130. These dialing digits may be received by microprocessor 130 in a variety of ways such as, for example, by depressing appropriate keys on input device 110, by sliding a magnetic card through a magnetic card reader (not shown), or by reciting the digits into a microphone which is coupled to appropriate voice recognition circuitry. At step 220, a generated signal is received which indicates that coinage will be used. This signal may be generated, for example, by depressing an appropriate pushbutton on input device 110, or on user interface 190. Alternatively, the signal may be generated by appropriate voice recognition circuitry which is optionally included in user interface 190. At step 230, adequate payment to complete the call is requested and received. The request for payment can be accomplished by printed instructions, visual instructions which appear on a display which is optionally included in user interface 190, or a message which is transmitted to a speaker within, for example, telephone handset 180. Adequate payment is received when the user inserts an appropriate amount of coinage to complete the call into a designated slot in telecommunications device 100. After appropriate mechanical and electrical systems (not shown) within telecommunications device 100 have determined that payment has been received by telecommunications device 100, then, at step 240, the telephone number dialing digits are retransmitted by microprocessor 130 to the central office (or an analogous switch). The central office may then assist in the completion of the telephone call.

Figure 3:
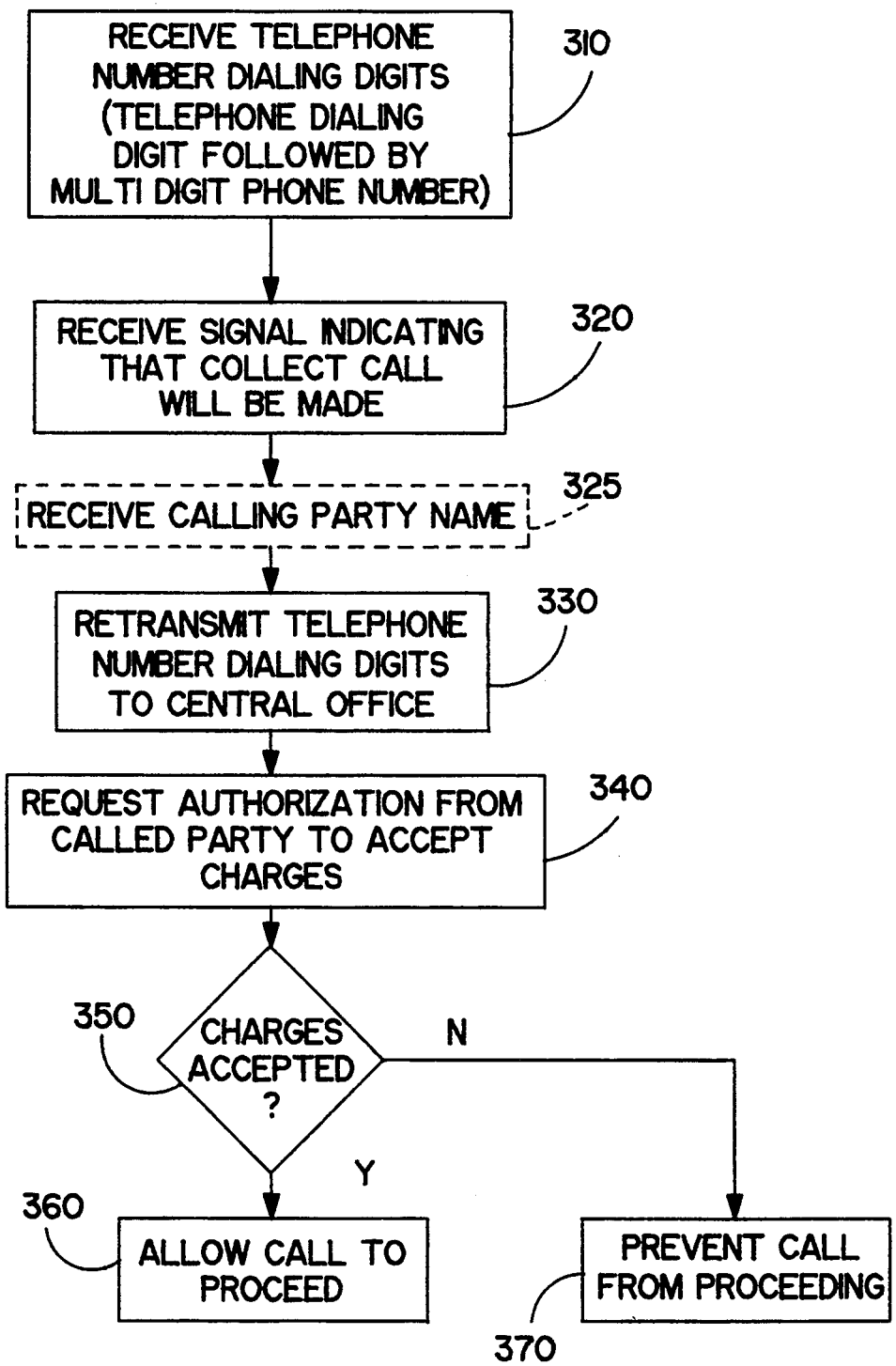
FIG. 3 is a flow chart diagram which illustrates the placement of a collect call in conjunction with an exemplary embodiment of the present invention.

A further exemplary embodiment of the present invention is illustrated by the flow chart shown in FIG. 3. The exemplary embodiment of the present invention illustrated in FIG. 3 may also be used in conjunction with the smart telephone illustrated by FIG. 1. FIG. 3 illustrates exemplary operation of the telecommunications device shown in FIG. 1 when a collect call is made. At step 310, the telephone number dialing digits are received by microprocessor 130. These dialing digits may be received in the manner set forth above with respect to FIG. 2. At step 320, a generated signal is received indicating that a collect call will be made. This signal may also be generated in a manner set forth above. At step 325, the name of the calling party is received by telecommunications device 100. This is an optional step. Again, this information can be received in a variety of ways.

At step 330, the telephone number dialing digits are retransmitted by microprocessor 130 to the central office (or an analogous switch). At step 340, authorization from the called party is requested to accept the charges. This request may be made by a voice synthesizer (not shown) which may be included in telecommunications device 100. At step 350, if the charges have been accepted (e.g. by a tone decoder receiving a tone or a voice recognizer receiving a predetermined response), then, at step 360, the call is allowed to proceed. Otherwise, at step 370, the call is terminated.

Figure 4:
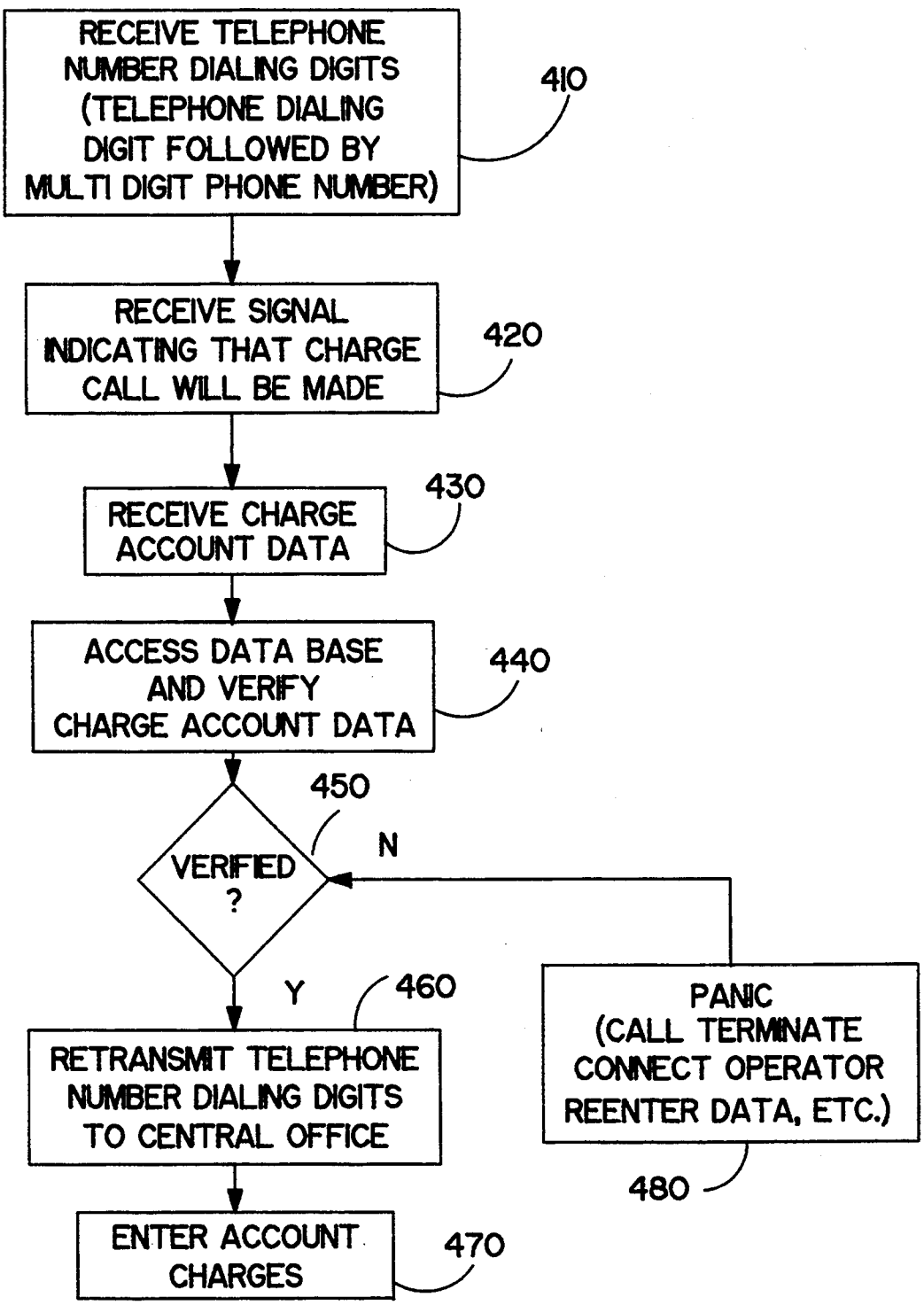
FIG. 4 is a flow chart diagram which illustrates the use of a calling card in conjunction with an exemplary embodiment of the present invention.

A further exemplary embodiment of the present invention is illustrated by FIG. 4. The exemplary embodiment of the present invention illustrated in FIG. 4 may be used in conjunction with a smart telephone as illustrated, for example, by FIG. 1. FIG. 4 illustrates exemplary operation of the telecommunications device shown in FIG. 1 when a charge card is used to complete a telephone call. Charge cards include, but are not limited to, credit cards, calling cards or debit cards. At step 410, telephone number dialing digits are received by microprocessor 130. Again, this may be accomplished in the manner set forth at step 210 of FIG. 2. At step 420, a generated signal is received indicating that a charge call will be made. Again, this signal can be generated in a manner similar to the manner in which signals are generated at step 220 of FIG. 2. At step 430, the charge account data is received using any of the data acquisition methods previously described. At step 440, a data base is accessed to verify the validity of the charge account data.

A database may be accessed by placing a separate telephone call to an appropriate data base. Alternatively, it is contemplated that the data base may be stored in the telecommunications device or at a remote site which is easily accessed by the telecommunications device without the need for placing a further telephone call. At step 450, if the charge account data has been verified, then, at step 460, the telephone number dialing digits are retransmitted to the central office (or an analogous switch). At step 470, the cost of the call is applied to the appropriate charge account. Again, this may be accomplished by placing a telephone call to an appropriate data base or by storing the information in the telecommunications device for later retrieval. At step 450, if the charge account data has not been verified, then, at step 480, a panic mode is entered. This panic mode may handle the inability to verify the charge account data in several ways. For example, the call may simply be terminated. Alternatively, the user may be requested to re-enter the charge account data information. The user may also be automatically connected, or given the option to be connected to a live operator for assistance in completing the call.

Figure 5:
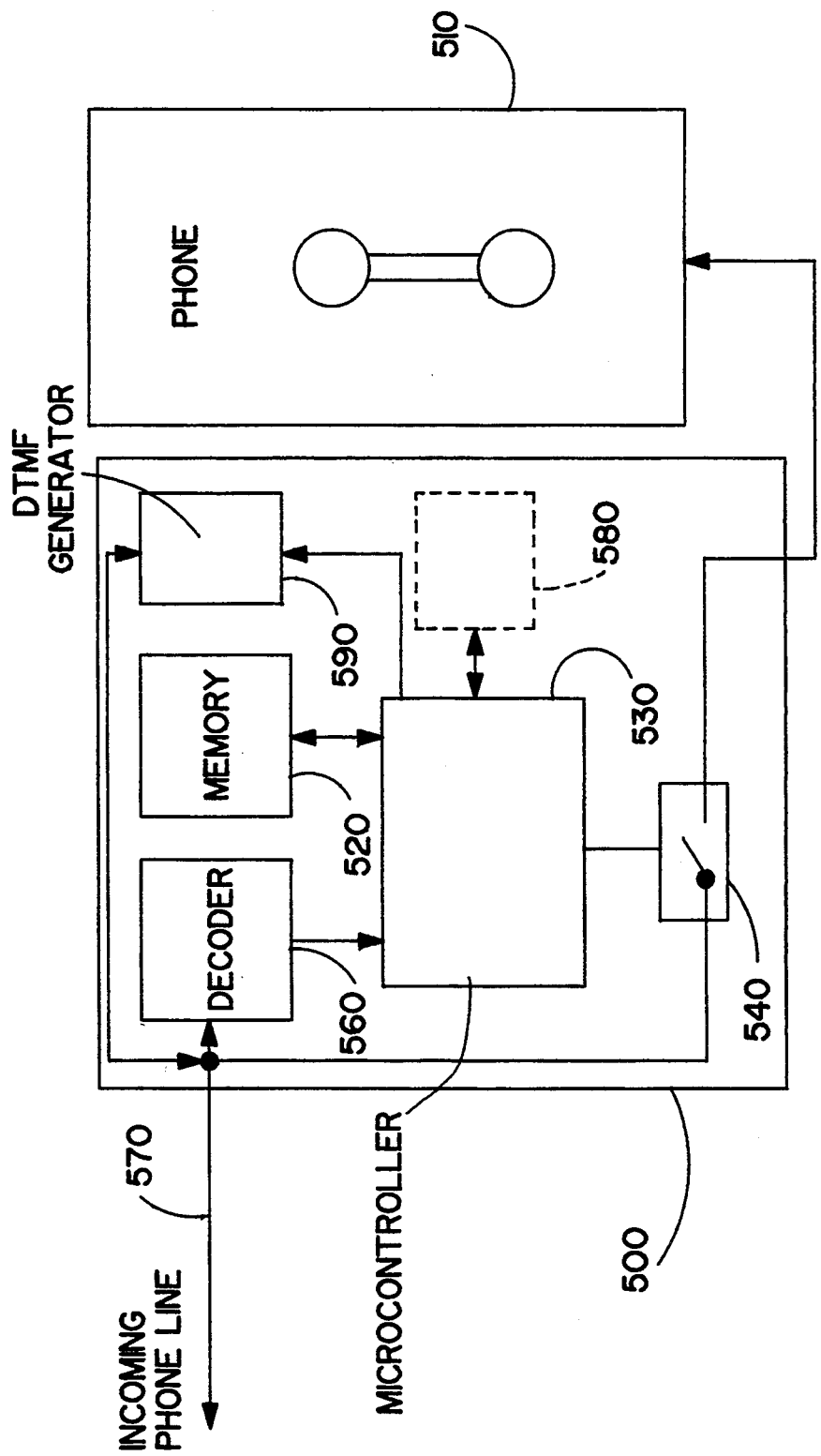
FIG. 5 is a block diagram of a standard "dumb" pay telephone and an external processing system which operates in accordance with a further exemplary embodiment of the present invention.

A further exemplary embodiment of the present invention is illustrated by FIG. 5. In FIG. 5, telecommunications device 510 is a standard "dumb" telecommunications device (e.g. without a microprocessor) which is connected to telecommunication lines 570 via interface unit 500. An exemplary "dumb" telecommunications device is AT&T Model 102 public telephone. As in the exemplary embodiment of the present invention which is illustrated by FIG. 1, telecommunications line 570 may have a variety of different functions.

The exemplary embodiment which is illustrated by FIG. 5 includes microcontroller 530 which receives instructions from memory 520. Decoder 560 receives a plurality of telephone numbers which are provided by telecommunications device 510. The telephone number sequence is converted to electrical signals which are transmitted to microcontroller 530. User interface 580 is optionally coupled to microcontroller 530. User interface 580 operates in a manner similar to that of user interface 190 of FIG. 1. DTMF generator 590 is also shown. DTMF generator 590 is capable of transmitting DTMF tones to phone line 570 responsive to signalling received from microcontroller 530. Switch 540 may be opened and then closed by microcontroller 530 in order to return dial tone to telecommunications 510.

Figure 6A:
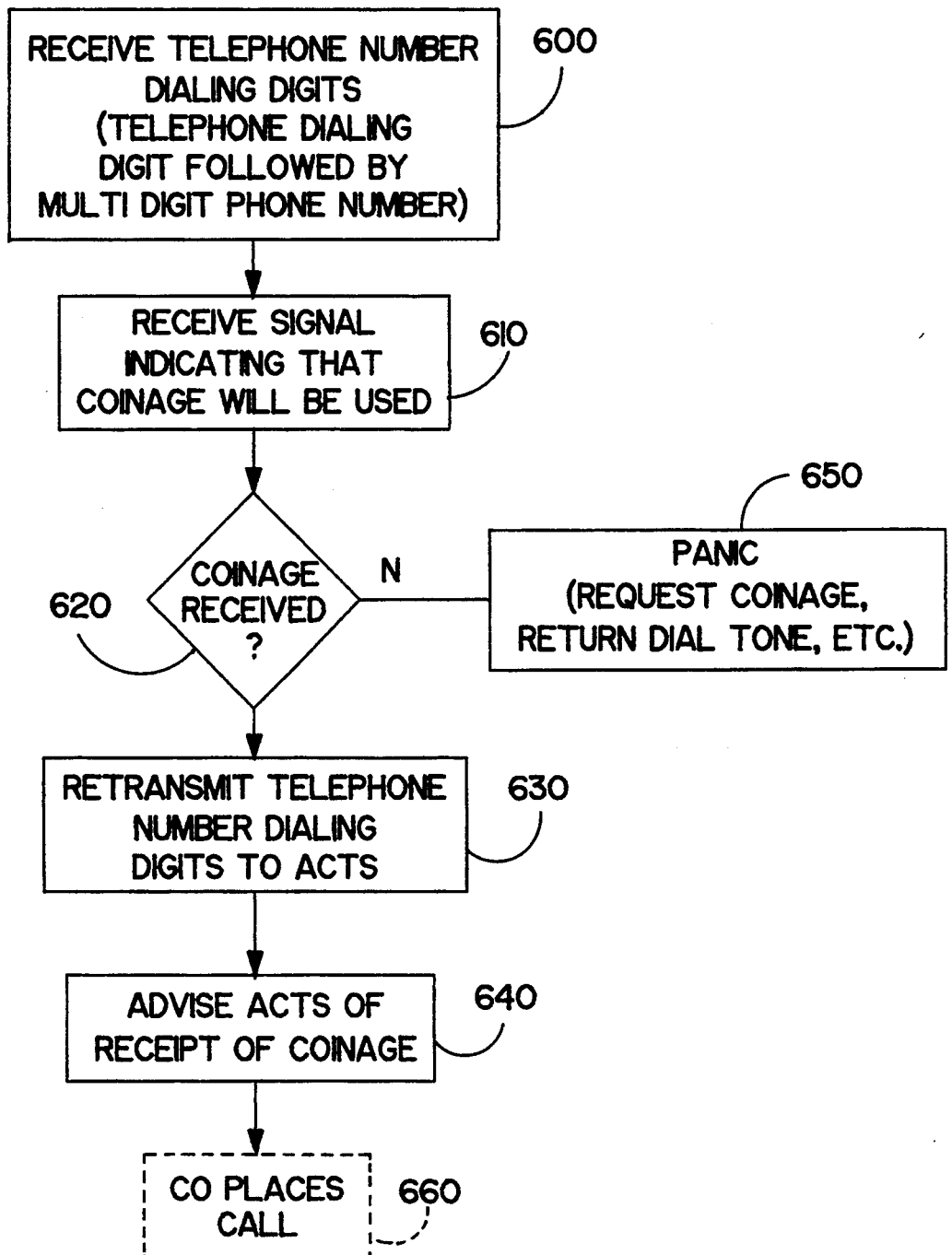
FIGS. 6A and 6B are flow chart diagrams which illustrate the use of coinage to place a call in accordance with further exemplary embodiments of the present invention.

Operation of a further exemplary embodiment of the present invention is illustrated by the flow chart diagram which is shown in FIG. 6A. The exemplary embodiment of the present invention which is illustrated in FIG. 6A may be used in conjunction with the "dumb" telephone and external processor 500 as illustrated, for example, by FIG. 5.

FIG. 6A illustrates exemplary operation of the "dumb" telephone and telecommunications device shown in FIG. 5 when coinage is used to complete a telephone call. At step 600, telephone number dialing digits which have been entered into telecommunications device 510 are received by external processor 500. At step 610, a signal is received by external processor 500 indicating that coinage will be used. This signal may be transmitted, for example, from telecommunications device 510 or user interface 580. If, at step 620, appropriate mechanical and electrical systems (not shown) within telecommunications device 510 determine that coinage has been received, then, telecommunications device 510 transmits appropriate signals to external processor 500 indicating the receipt of coinage. Based upon these signals, if external processor 500 determines that sufficient coinage has been received in order to complete the call, then, at step 630, external processor 500 transmits the previously received telephone number dialing digits to the automatic coin telephone service (ACTS). At step 640, ACTS is advised of the receipt of coinage. Then, at step 660, the central office (or an analogous switch) allows the call to proceed. If, at step 620, coinage was not received, then, at step 650, external processor 500 enters a panic mode. In this panic mode, external processor 500 may take one of several courses of action. For example, processor 500 may request entry of appropriate coinage. Alternatively, processor 500 may simply return dial tone before ceasing execution.

Figure 6B:
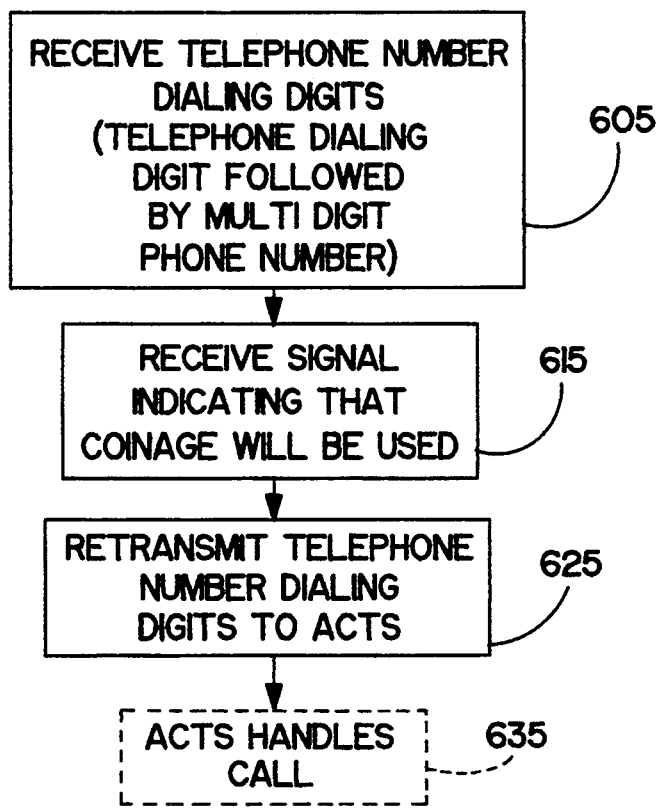

An alternative manner for placing a phone call through the use of coinage is illustrated by the flow chart diagram which is shown in FIG. 6B. At step 605, telephone number dialing digits which have been entered into telecommunications device 510 are received by external processor 500. At step 615, a signal is received by external processor 500 indicating that coinage will be used. At step 625, the telephone number dialing digits are retransmitted to ACTS. Finally, at step 635, ACTS is accessed to assist in further handling of the call.

Figure 7:
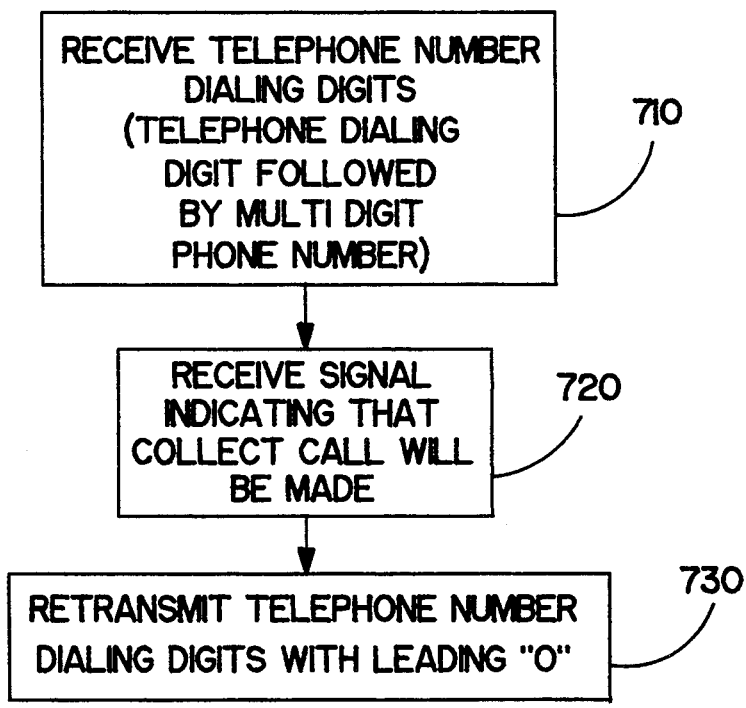
FIG. 7 is a flow chart diagram which illustrates the placement of a collect call in conjunction with a further exemplary embodiment of the present invention.

Operation of a further exemplary embodiment of the present invention is illustrated by the flow chart diagram which is shown in FIG. 7. The exemplary embodiment of the present invention which is illustrated by FIG. 7 may be used in conjunction with the "dumb" telephone and external processor 500 as illustrated, for example, by FIG. 5. FIG. 7 illustrates exemplary operation of the "dumb" telephone and telecommunications device shown in FIG. 5 when a telephone call is placed collect. At step 710, telephone number dialing digits which have been entered into telecommunications device 510 are received by external processor 500. At step 720, a signal is received by external processor 500 indicating that a collect call is being made. This signal may be transmitted, for example, from telecommunications device 510 or user interface 580. At step 730, the telephone number dialing digits are transmitted by external processor 500 to the central office (or an analogous switch). However, the retransmitted telephone number dialing digits are preceded by a dialing signal which indicates that a collect call is being made. Presently, the signal is telephone dialing number "0". The central office may then assist in the completion of billing arrangements for the telephone call.

Figure 8A:
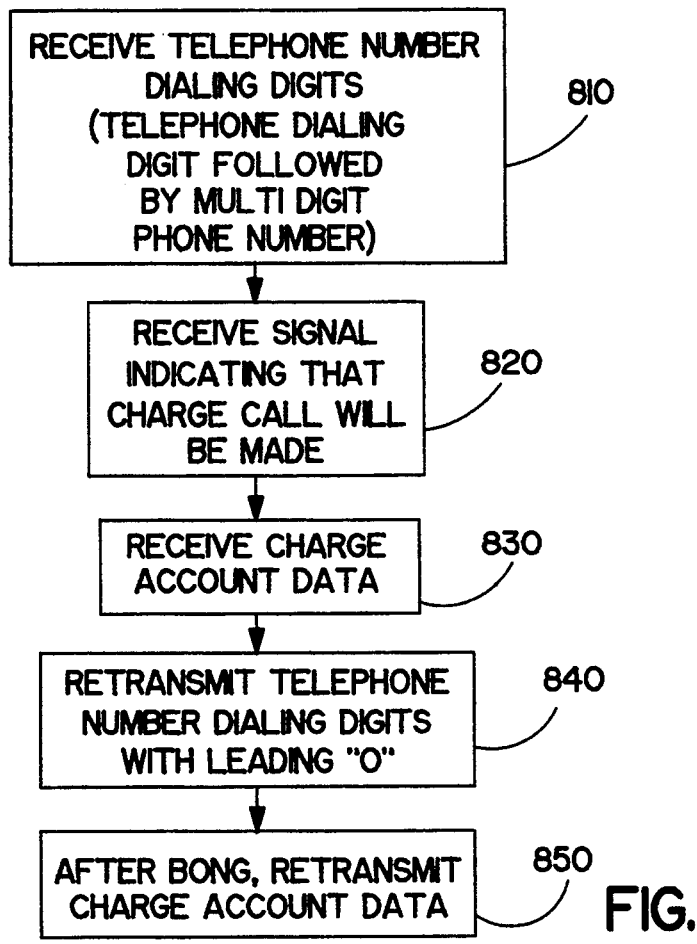
FIGS. 8A and 8B are flow chart diagrams which illustrate the placement of a calling card call in conjunction with further exemplary embodiments of the present invention.

Operation of a further exemplary embodiment of the present invention is illustrated by the flow chart which is shown in FIG. 8A. The exemplary embodiment of the present invention which is illustrated by FIG. 8A may be used in conjunction with the "dumb" telephone and external processor 500 as illustrated, for example, by FIG. 5. FIG. 8A illustrates exemplary operation of the "dumb" telephone and telecommunications device shown in FIG. 5 when a charge card is used to complete a telephone call. At step 810, telephone number dialing digits which have been entered into telecommunications device 510 are received by external processor 500. At step 820, a signal is received by external processor 500 indicating that a charge call is being made. This signal may be transmitted, for example, from telecommunications device 510 or user interface 580. At step 830, previously described data acquisition methods are used to provide charge account data to external processor 500. Charge account data comprises an account number to which the cost of the call will be billed. Exemplary charge accounts may be accessed using calling cards, charge cards, debit cards, etc. At step 840, the telephone number dialing digits are transmitted by external processor 500 to the central office (or an analogous switch). When these digits are transmitted, they are preceded by a signal which indicates that a charge call is being made. Presently, the signal in use is the telephone dialing digit "0". At step 850, the charge account data is transmitted by external processor 500 to phone line 570. The central office subsequently receives this information and bills the appropriate account.

Figure 8B:
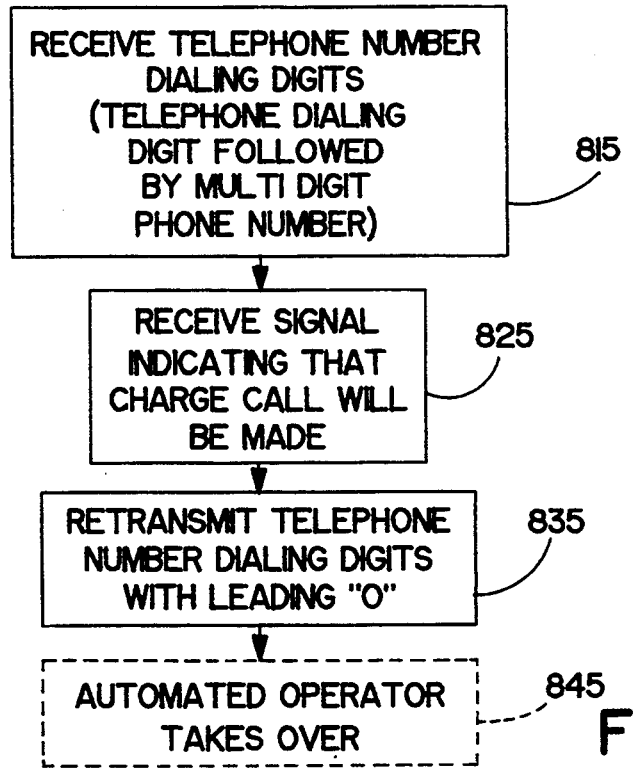

In FIG. 8B, a flow chart diagram which illustrates a further exemplary embodiment of the present invention is shown. The exemplary embodiment of the present invention which is illustrated by FIG. 8B may be used in conjunction with the "dumb" telephone and external processor 500 as illustrated, for example, by FIG. 5. FIG. 8B illustrates exemplary operation of the "dumb" telephone and telecommunications device shown in FIG. 5 when a charge card is used to complete a telephone call. At step 815, telephone number dialing digits which have been entered into telecommunications device 510 are received by external processor 500. At step 825, external processor 500 receives a signal indicating that a charge call is being made. This signal may be transmitted, for example, from telecommunications device 510 or user interface 580. At step 835, external processor 500 transmits the telephone number dialing digits to the central office (or an analogous switch). These dialing digits are preceded by a signal which indicates that a charge call is being made. Presently, dialing digit "0" is used to indicate that a charge call is being made. After transmission of the telephone number dialing digits has been completed, at step 845, an automated operator situated, for example, at the central office, intervenes to provide for payment, arrangements through the use of the charge account. Thus, the central office participates in completing the call.

With respect to the exemplary embodiments set forth above, it is understood that the invention can be practiced over a normal pay phone channel or communications channel. Thus, it is not necessary to use an ISDN channel.

The methods illustrated by FIGS. 2, 3 and 4 may be implementable (with appropriate adaptation) with the system illustrated by FIG. 5. Also, the methods illustrated by FIGS. 6A, 6B, 7, 8A and 8B may be implementable (with appropriate adaptation) with the system, illustrated by FIG. 1. Several of the methods previously disclosed which are particularly suitable for a "smart" or a "non-coin" telephone line (e.g. a COPT line or a PAL line) may be implementable (with appropriate adaptation) for a "coin" telephone line. Furthermore, several of the methods previously disclosed which are particularly suitable for a "coin" telephone line (i.e. which provide answer supervision) may be implementable (with appropriate adaptation) for a "smart" or a "non-coin" telephone line. One skilled in the art could readily implement the necessary adaptation.

While most telephone numbers are presently entered using a three digit area code (when needed), a three digit exchange and a four digit number within the exchanger future expansion of the North American dialing plan may require a different number of telephone dialing digits to be entered in order for a telephone call to be completed. Thus, the number of telephone number dialing digits which are entered by a user in order to complete a call may vary from the number presently required.

In addition, the present invention provides for telephone numbers to be prefixed with a telephone dialing digit other than "0" when initially entered by the user into the telecommunications device. In an exemplary embodiment of the present invention, telephone number dialing digit "1" is entered prior to entry of the remaining seven or ten telephone number dialing digits. However, it is understood that other telephone number dialing digits may be entered. In a further exemplary embodiment of the present invention, all telephone calls are prefixed by a common number regardless of the type of call being made.

Furthermore, the transmission of telephone number dialing digit "0" followed by the telephone number currently indicates to the central office that the call is being paid for through a method other than coinage. It is understood that some future signals other than the transmission of telephone number dialing digit "0", may be used.

While the invention has been described in terms of an exemplary embodiment, it is contemplated that it may be practiced as outlined above with modifications within the spirit and scope of the appended claims.

What is claimed:

1. A method for placing a telephone call through a central office from a telecommunications device according to a desired method of making payment, said method comprising the steps of:
   receiving a first plurality of signals which represent a telephone dialing digit not including "0" followed by a multi-digit phone number, said telephone dialing digit being independent of the desired method of making payment;
   receiving at least one further signal which indicates said desired method of making payment for said telephone call after said multi-digit phone number has been received;
   providing for payment of said telephone call according to said desired method of making payment; and
   placing said telephone call by transmitting a plurality of Dual Tone Multiple Frequency signals representing said multi-digit phone number to said central office.

2. A method for placing a telephone call through a central office from a telecommunications device according to claim 1, wherein said at least one further signal indicates that coinage will be used to pay for said telephone call.

3. A method for placing a telephone call through a central office from a telecommunications device according to claim 1, wherein said telephone call is placed between a calling party and a called party, and wherein the step of providing for payment of said telephone call according to said desired method of making payment includes the steps of:
   requesting said called party to accept responsibility for payment of said telephone call;
   receiving agreement from said called party to accept responsibility for payment of said telephone call;
   allowing said call to proceed if said called party agrees to accept responsibility for payment of said telephone call; and preventing said call from proceeding if said called party does not agree to accept responsibility for payment of said telephone call.

4. A method for placing a telephone call through a central office from a telecommunications device according to claim 3, wherein the step of providing for payment of said telephone call according to said desired method of making payment includes the further steps of:

receiving a name which identifies said calling party; and advising said called party of said name of said back party.

5. A method for placing a telephone call through a central office according to claim 1, wherein the step of providing for payment of said telephone call according to said desired method of making payment includes the steps of:

receiving charge account data, said charge account data corresponding to a charge account to which said telephone call is to be billed;

performing a validity verification of said charge account data;

allowing said telephone call to be placed according to claim 1 only if said charge account data is determined to be valid.

6. A method for placing a telephone call through a central office from a telecommunications device according to a desired method of making payment, said method comprising the steps of:

receiving a first plurality of signals which represents a telephone dialing digit not including "0" followed by a multi-digit phone number, said telephone dialing digit being independent of the desired method of making payment;

receiving at least one further signal which indicates said desired method of making payment for said telephone call after said multi-digit phone number has been received;

transmitting a plurality of Dual Tone Multiple Frequency signals representing said multi-digit phone number to said central office;

allowing said central office to complete payment arrangements for said telephone call.

7. A method for placing a telephone call through a central office from a telecommunications device according to claim 6, wherein said telecommunications device receives coinage before said plurality of Dual Tone Multiple Frequency signals representing said multi-digit phone number are transmitted to said central office.

8. A method for placing a telephone call through a central office from a telecommunications device according to claim 6, wherein said at least one further signal which indicates said desired method of making payment indicates that placement of a collect call is requested.

9. A method for placing a telephone call through a central office from a telecommunications device according to claim 8, wherein said plurality of Dual Tone Multiple Frequency signals transmitted to said central office are preceeded by at least one Dual Tone Multiple Frequency signal representing telephone dialing digit "0".

10. A method for placing a telephone call through a central office from a telecommunications device according to claim 6, wherein charge account data is received by said telecommunications device and wherein said received charge account data is re-transmitted by said telecommunications device to said central office after said plurality of Dual Tone Multiple Frequency signals representing said multi-digit phone number is transmitted to said central office.

11. A method of placing a telephone call through a central office from a telecommunications device according to claim 6, wherein charge account data is received by said telecommunications device and said charge account data is transmitted to said central office as said charge account data is received.

* * * * *

UNITED STATES PATENT AND TRADEMARK OFFICE
CERTIFICATE OF CORRECTION

| | | |
|---|---|---|
| PATENT NO. | : | 5,359,643 |
| DATED | : | October 25, 1994 |
| INVENTOR(S) | : | John R. Gammino |

It is certified that error appears in the above-identified patent and that said Letters Patent is hereby corrected as shown below:

Column 5, line 48, delete between "telecommunications" and "510" insert --device--.

Column 9, Claim 4, line 13, delete "back" and insert --calling--.

Signed and Sealed this

Eighteenth Day of April, 1995

*Attest:*

BRUCE LEHMAN

*Attesting Officer*  *Commissioner of Patents and Trademarks*